(No Model.)

D. R. McKIM.
PACKING FOR PIPE COUPLINGS.

No. 516,216. Patented Mar. 13, 1894.

Witnesses,

Inventor;
David R. McKim,
by his attorneys
Baldwin Davidson Wight

UNITED STATES PATENT OFFICE.

DAVID R. McKIM, OF MARTIN'S FERRY, OHIO.

PACKING FOR PIPE-COUPLINGS.

SPECIFICATION forming part of Letters Patent No. 516,216, dated March 13, 1894.

Application filed August 9, 1893. Serial No. 482,781. (No model.)

*To all whom it may concern:*

Be it known that I, DAVID R. McKIM, a citizen of the United States, residing at Martin's Ferry, in the county of Belmont and State of Ohio, have invented certain new and useful Improvements in Packing for Pipe-Couplings, of which the following is a specification.

The object of my invention is to produce a pipe coupling with a secure gas-tight or fluid-tight joint and packing. I accordingly interpose between the two coupling members a ring or washer comprising a gasket of suitable packing material, such as rubber, provided with a casing of metal, such as sheet copper, having perforations on one side and turned over edges on the opposite side. I prefer to boil the combined copper and rubber washer in oil and plumbago, to make it more secure. Instead of rubber I may use asbestus, when the coupling is exposed to heat.

Figure 1:
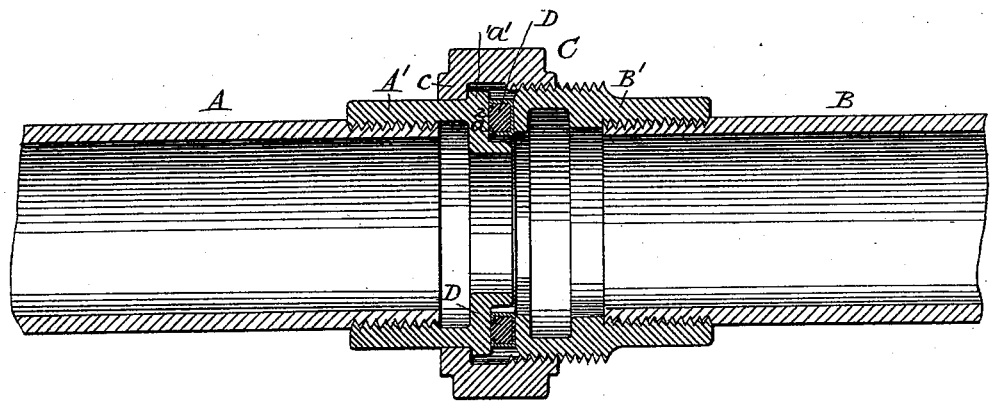
Figure 2:
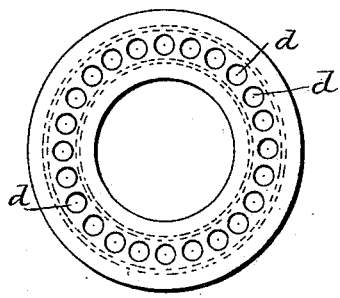
Figure 3:
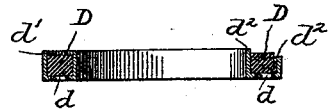
Figure 4:
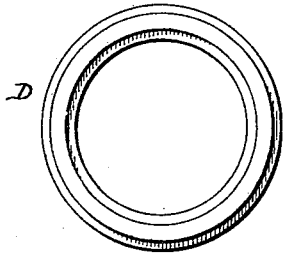
Figure 5:
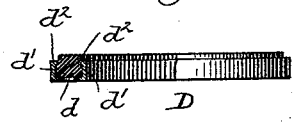

In the accompanying drawings,—Figure 1 is a longitudinal, central section through a pipe coupling, with my improvements applied. Fig. 2 is a plan view of a perforated sheet metal ring from which the casing for the rubber is made. Fig. 3 is a transverse section of the combined copper and rubber washer with the rubber partially incased. Fig. 4 is a plan view of one side of the completed washer. Fig. 5 is a transverse section through the completed washer.

The pipe sections A B have secured to their adjacent ends coupling members A' B'. The member B' is screw-threaded to receive a sleeve nut C, which is provided with a flange $c$, fitting a shoulder $a'$ on the coupling member A'. By this construction, the two coupling members may be drawn toward each other. The member A' is provided with a shoulder $a^2$, and between the shouldered portion of the member A' and the end of the member B', I interpose the packing ring or washer D.

The washer D, is preferably formed as follows: I take an annular piece of sheet metal, such as copper, and perforate it at $d$, as shown in Fig. 2. I then bend the ring to form an annular trough or recess $d'$ to receive the packing ring E, which is preferably of rubber, as above stated. I then turn down the edges $d^2$, of the copper, so that it shall overlap the annular edges of the rubber, as indicated in Fig. 3. When the edges are completely turned, they will hold the rubber ring or gasket firmly in position, as indicated in Fig. 5.

The combined metallic and rubber washer is preferably boiled in oil and plumbago, to increase its packing capacity, and it is arranged in place between the coupling members A' and B', as indicated in Fig. 1. The nut C, may be adjusted to hold all the parts tightly in place. The rubber projects beyond the flanges $d^2$, and also extends through the perforations $d$, against the walls of the coupling members, and a secure, tight packing is afforded. At the same time, the inner and outer edges of the gasket are protected by the metallic casing, so that steam or other fluid, which would have a deteriorating effect on the rubber, is prevented from reaching it.

I claim as my invention—

1. The combination of the coupling members and an annular washer, comprising a metal casing surrounding a packing material, boiled in oil and plumbago.

2. A packing washer comprising an annular gasket of packing material, such as rubber, or asbestus, and an annular sheet metal casing having the perforations $d$ on one side and the turned-over edges $d^2$, on the opposite side for holding the gasket in place.

3. A packing washer comprising an annular gasket of packing material, such as rubber, and a sheet metal casing having an annular recess or trough in which the gasket is seated, and having perforations at the bottom of the trough or recess, and turned-over edges at the top thereof, for the purpose specified.

In testimony whereof I have hereunto subscribed my name.

DAVID R. McKIM.

Witnesses:
JNO. W. TERRILL,
GEO. G. RALSTON.